W. H. GREEN.
WATER PURIFIER.
APPLICATION FILED OCT. 18, 1907.
898,735.
Patented Sept. 15, 1908.
2 SHEETS—SHEET 1.
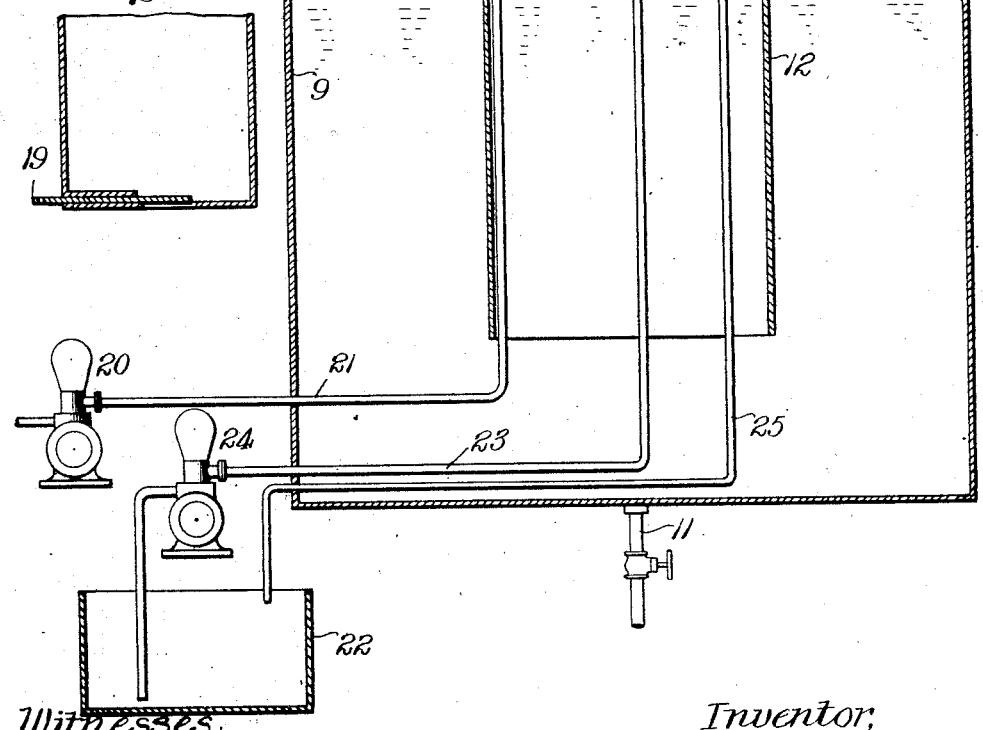
Witnesses:
John Enders
Chas. H. Buell
Inventor,
Walter H. Green,
By Dyrenforth, Lee, Chritton & Wiles,
Attys

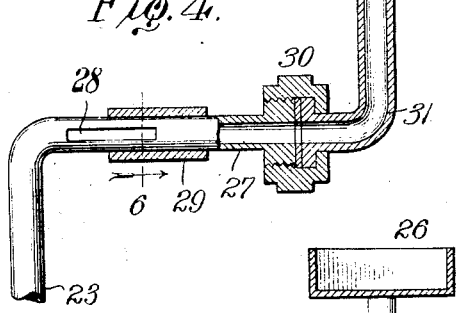
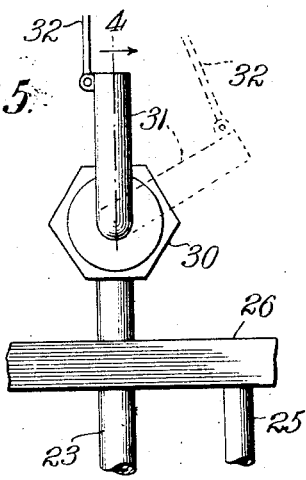
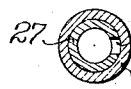
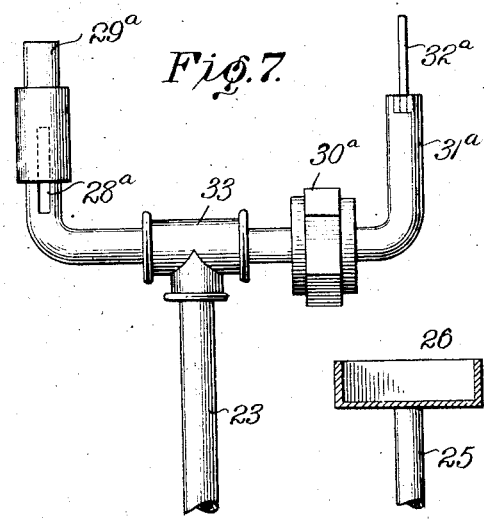
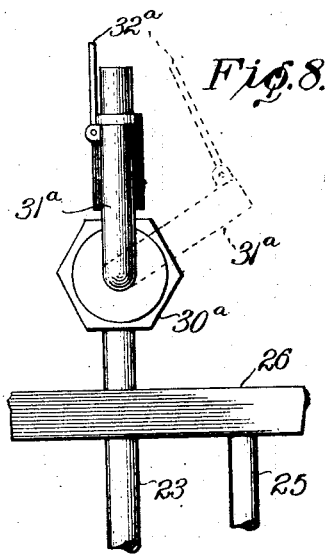

UNITED STATES PATENT OFFICE.

WALTER H. GREEN, OF CHICAGO HEIGHTS, ILLINOIS, ASSIGNOR TO KENNICOTT WATER SOFTENER COMPANY, OF CHICAGO, ILLINOIS, A CORPORATION OF ILLINOIS.

WATER-PURIFIER.

No. 898,735.   Specification of Letters Patent.   Patented Sept. 15, 1908.

Application filed October 18, 1907. Serial No. 397,960.

*To all whom it may concern:*

Be it known that I, WALTER H. GREEN, a citizen of the United States, residing at Chicago Heights, in the county of Cook and State of Illinois, have invented a new and useful Improvement in Water-Purifiers, of which the following is a specification.

My invention relates to an improvement in apparatus for purifying, or softening, water for industrial purposes; and the primary object of my improvement is to enable the apparatus to be so simplified in construction as to avoid all necessity of frequently climbing it for manipulating mechanism in elevated position, for adjustment and other purposes.

In the accompanying drawings, Figure 1 is a view in vertical sectional elevation of a water-softening apparatus constructed in accordance with my invention; Fig. 2, a view in side elevation of the valved hard or "raw" water-box; Fig. 3, a section taken at the line 3 on Fig. 2, and viewed in the direction of the arrow; Fig. 4, a broken and partly sectional view on line 4 of Fig. 5, of one form of the means I have devised for automatically proportioning the feed of the chemical solution to that of the water under treatment, and showing the device in its position relative to an overflow-receptacle; Fig. 5, a broken view of the same in end elevation, showing one position by dotted representation; Fig. 6, a section taken at the line 6 on Fig. 4, and viewed in the direction of the arrow; Fig. 7, a broken view in elevation showing a modified construction of the device illustrated in Fig. 4, and Fig. 8, a similar view of the same regarded in the direction of the arrow in Fig. 7.

The precipitating-tank 9 equipped with an overflow 10 near its upper end and a valved pipe 11 on its bottom for drawing off sludge and containing a downtake-conduit 12 presents no features of novelty; and the same is true of the water-box 13 surmounting the precipitating-tank and in which a float 14 is suspended by a rod 15 from one end of a lever 16 fulcrumed at its opposite end on a standard 17. In a side of the box 13 near its bottom is provided a discharge-opening 18 through which to direct the raw water into the top of the conduit 12, and this opening is shown to be equipped with a slide-valve 19 for regulating the area of the discharge-opening. The valve is, however, an unnecessary feature inasmuch as when it is once set for a given size of apparatus it need never be changed, the only advantage in providing the valve being that it enables a stock of similar water-boxes to be manufactured and kept, from which to equip water-softening plants of varying sizes by adjusting the valves to such sizes.

The raw water to be treated is supplied from any suitable source and introduced, as through the medium of a pump represented at 20 discharging through a pipe 21, into the box 13 at its open top. The chemical solution is contained in a tank 22 shown to be supported at the base of the settling-tank 9, though it may be supported in any other position desired. The solution is fed to the tank 9 through a pipe 23 in which a pump 24 is shown to be interposed; and another pipe 25 surmounted by a receptacle 26 leads from the latter to the tank 22 to return into it and thus save the overflow of the solution.

As represented in Figs. 1, 4 and 5, the pipe 23 above the top of the settling-tank is bent to a right-angle to form a horizontal tubular arm 27 containing a lateral elongated slot 28 about which fits a longitudinally slidable sleeve 29 for regulating the discharge-area of the slot. As in the case of the valve 19, when the sleeve 29 is once adjusted for a given size of apparatus its adjustment will be permanent, so that the sleeve is not a necessary feature of the device. On the outer end of the arm 27 is rotatably fastened through the medium of a stuffing-box 30, or packed-joint, an extension 31 bent to project at an angle, and preferably a right-angle, to the arm and connected from its free end by a link 32 with the lever 16. The adjustable extension 31, which automatically maintains the head of the solution in correspondence with that of the water in the box 13, is directly above the receptacle 26.

In the operation of the apparatus the raw water to be treated enters the box 13 through the pipe 21 and discharges through the opening 18 in the latter into the downtake-conduit 12 while the chemical solution enters that conduit from the pipe 23 through the discharge-slot 28 to mix with the water for its reaction thereon. Any increase or decrease in the rate of flow through the pipe 21, under variation in the operation of the pump 20, will raise or lower the level of water in the box 13, thereby varying the head thereof and raising or lowering the float 14 correspondingly. As the float rises or falls it moves the lever 16 accordingly causing the latter through the link 32 to raise or lower the outer end of the extension 31 to correspond with the change of water-level in the box 13 and thus vary the head of the solution in the extension in accordance with the variation of head in the water-box, so that as the rate of flow through the slot 18 changes under variation of head in the water-box, that of the solution through the slot 28 will vary correspondingly as the outer end of the extension 31 is raised or lowered under the action of the float. The surplus of the solution overflows from the open outer end of the rotatable extension into the receptacle 26 whence it returns through the pipe 25 to the tank 22 and is saved.

From the foregoing description of the operation it will be seen that regulation of the supply of treating reagent to the raw water is effected by automatically varying the head of the supply of reagent in a manner to vary its level with relation to a fixed discharge of the solution to the water in accordance with variation in the supply of raw water to the apparatus; which constitutes the gist of my invention. This method forms the subject of my divisional application, Serial No. 416,264, filed on the 17th day of February, 1908. The same result is accomplished in substantially the same way by the modified construction illustrated in Figs. 7 and 8: Therein the pipe 23 terminates at its upper end in a T-coupling 33 from one end of which projects a rigid angular and tubular arm 29ª, the outer section extending by preference vertically and containing a lateral perpendicular elongated discharge-slot 28ª for the solution, while at the opposite end of the coupling is rotatably supported in alinement with the receptacle 26, through the medium of a stuffing-box 30ª, or packed-joint, the angular extension 31ª, similar to the extension 31 and like the latter having a link-connection 32ª with the lever 16. With this construction raising or lowering of the extension 31ª under the action of the float correspondingly changes the head of solution therein (any overflow of the solution falling into the receptacle 26), the level of the solution in the extension, whatever its position, being necessarily the same as the level thereof in the arm 29ª.

What I claim as new and desire to secure by Letters Patent is—

1. In a water-purifying apparatus, the combination with a precipitating-tank, of a water-box having a fixed discharge and containing a float, a reagent-supply pipe having a fixed discharge, and a movably-supported tubular extension of said pipe forming an overflow for the reagent-supply and operatively connected with said float, for the purpose set forth.

2. In a water-purifying apparatus, the combination with a precipitating-tank, of a water-box having a fixed discharge and containing a float, a reagent-supply pipe having a fixed discharge, a chemical-solution-tank from which said pipe leads, a movable tubular extension of said pipe operatively connected with said float, and a receptacle supported to receive the overflow from said extension and having a return-pipe leading from it to said solution-tank, for the purpose set forth.

3. In a water-purifying apparatus, the combination with a precipitating-tank, of a water-box containing a float and a slot forming a fixed-discharge to said tank, a reagent-supply pipe having a tubular arm containing a slot forming a fixed discharge to said tank, and a movably-supported extension of said pipe forming an overflow for the reagent-supply and operatively connected with said float, for the purpose set forth.

4. In a water-purifying apparatus, the combination with a precipitating-tank, of a water-box containing a float and a slot forming a fixed discharge to said tank, a reagent-supply pipe having a tubular arm containing a slot forming a fixed discharge to said tank, a rotatably-supported extension of said pipe operatively connected with said float, a chemical-solution tank from which said pipe leads, a receptacle supported to receive the overflow from said extension, and a return-pipe leading from said receptacle to the solution-tank, for the purpose set forth.

5. In a water-purifying apparatus, the combination with a precipitating-tank, of a water-box containing a float and a slot forming a fixed discharge to said tank, a reagent-supply pipe having a tubular arm containing a slot forming a fixed discharge to said tank, a rotatably-supported extension of said pipe forming an overflow for the reagent-supply, a lever fulcrumed on a suitable support and having said float suspended from it, and a link connection between said lever and extension, for the purpose set forth.

6. In a water-purifying apparatus, the combination with a precipitating-tank, of a water-box surmounting said tank and containing a float and a slot forming a fixed discharge to said tank, a reagent-supply pipe having a tubular arm extending at an angle thereto above said tank and containing a slot forming a fixed discharge thereto, and an angular extension of said arm rotatably connected therewith, forming an overflow for the reagent-supply and operatively connected with said float, for the purpose set forth.

7. In a water-purifying apparatus, the combination with a precipitating-tank, of a water-box surmounting it and containing a float and a slot forming a fixed discharge to said tank, a raw-water supply-pipe discharging into the upper end of said tank and containing a pump, a solution-tank, a pipe containing a pump and leading from the solution-tank to the upper end of the precipitating-tank, a tubular arm extending at an angle from the solution-pipe above the precipitating tank and containing a slot forming a fixed discharge thereto, an angular extension of said arm rotatably connected therewith, a lever fulcrumed on a support and having the float suspended from it and a link-connection with said extension, a receptacle supported to receive the overflow from said extension, and a return-pipe leading from said receptacle to the solution-tank, for the purpose set forth.

WALTER H. GREEN.

In presence of—
RALPH SCHAEFERS,
W. T. JONES.